United States Patent [19]

Chew et al.

[11] Patent Number: 5,764,983
[45] Date of Patent: Jun. 9, 1998

[54] METHOD AND SYSTEM FOR EFFICIENTLY CREATING A NEW FILE ASSOCIATED WITH AN APPLICATION PROGRAM

[75] Inventors: Chee Heng Chew; Joseph D. Belfiore, both of Redmond, Wash.

[73] Assignee: Microsoft Corporation, Redmond, Wash.

[21] Appl. No.: 554,489

[22] Filed: Nov. 7, 1995

[51] Int. Cl.⁶ .................................................. G06F 9/00
[52] U.S. Cl. ............................................................ 395/682
[58] Field of Search .................................. 395/680, 682, 395/683, 701, 702, 703, 685, 339, 340, 343, 346, 718

[56] References Cited

U.S. PATENT DOCUMENTS

| | | | |
|---|---|---|---|
| 5,303,379 | 4/1994 | Khoyi et al. ................................ | 395/677 |
| 5,574,905 | 11/1996 | de Carmo ................................ | 395/601 |
| 5,604,905 | 2/1997 | Tevanian et al. ........................ | 395/706 |
| 5,644,682 | 7/1997 | Weinberger et al. .................... | 395/101 |

Primary Examiner—Kevin A. Kriess
Attorney, Agent, or Firm—Seed and Berry LLP

[57] ABSTRACT

The present invention provides a method and system in a computer system for creating a new file system object. The method and system operates under the control of an operating system installed on the computer system. The method and system displays a list of types of filesystem objects that may be created. The method and system subsequently receives input indicating that a user has selected a displayed filesystem object type. The method and system then creates a new file system object having the selected type.

41 Claims, 25 Drawing Sheets object creation table 400

| user object type 401 | system object type 402 | creation mode 403 | argument (optional) 404 |
|---|---|---|---|
| "Text Document" | txt.file | empty | |
| "Microsoft Word Document" | Word.Document.6 | file | "c:\windows\shellnew\winword.doc" |
| "Bitmap Image" | Paint.Picture | empty | |
| "Wave Sound" | SoundRec | data | 52 49 46 46 30 00 00 00 |
| "Microsoft Power Point Presentation" | PowerPoint.Show | file | "c:\windows\shellnew\ppt70.ppt" |
| "Microsoft Excel Worksheet" | Excel.Sheet.5 | file | "c:\windows\shellnew\excel.xls" |
| "Other Office Document" | Office.FileNew | command | "c:\msoffice\office\create_office.exe /n" |
| ... | | | |

*FIG. 4*

| system object type | command for launching associated application |
|---|---|
| txt.file | "c:\windows\notepad.exe %1" |
| Word.Document.6 | "c:\msoffice\winword\winword.exe" |
| Paint.Picture | "c:\programs\accessories\mspaint.exe %1" |
| SoundRec | "c:\windows\soundrec32.exe %1" |
| Excel.Sheet.5 | "c:\msoffice\excel\excel.exe /e" |
| ... | |

500 — system object type table
501 — system object type
502 — command for launching associated application

*FIG. 5* object creation table 800

| user object type | system object type | creation mode | argument (optional) |
|---|---|---|---|
| "Text Document" | txt.file | empty | |
| "Microsoft Word Document" | Word.Document.6 | file | "c:\windows\shellnew\winword.doc" |
| "Bitmap Image" | Paint.Picture | empty | |
| "Wave Sound" | SoundRec | data | 52 49 46 46 30 00 00 00 |
| "Microsoft Excel Worksheet" | Excel.Sheet.5 | file | "c:\windows\shellnew\excel.xls" |
| "Other Office Document" | Office.FileNew | command | "c:\msoffice\office\create_office.exe /n" |
| ... | | | |

FIG. 8 object creation table 1000

| user object type | system object type | creation mode | argument (optional) |
|---|---|---|---|
| "Text Document" | txt.file | empty | |
| "Microsoft Word Document" | Word.Document.6 | file | "c:\windows\shellnew\winword.doc" |
| "Bitmap Image" | Paint.Picture | empty | |
| "Wave Sound" | SoundRec | data | 52 49 46 46 30 00 00 |
| "Microsoft Excel Worksheet" | Excel.Sheet.5 | file | "c:\windows\shellnew\excel.xls" |
| "Other Office Document" | Office.FileNew | command | "c:\msoffice\office\create_office.exe /n" |
| "AmiPro Document" | AmiPro.Document | file | "c:\windows\shellnew\amipro.sam" |
| ... | | | |

*FIG. 10* object creation table

| system object type | user object type | creation mode | argument (optional) |
|---|---|---|---|
| "Text Document" | txt.file | empty | |
| "Microsoft Word Document" | Word.Document.6 | file | "c:\windows\shellnew\winword.doc" |
| "Bitmap Image" | Paint.Picture | file | "c:\frame.bmp" |
| "Wave Sound" | SoundRec | data | 52 49 46 46 30 00 00 00 |
| "Microsoft Excel Worksheet" | Excel.Sheet.5 | file | "c:\windows\shellnew\excel.xls" |
| "Other Office Document" | Office.FileNew | command | "c:\msoffice\office\create_office.exe /n" |
| "AmiPro Document" | AmiPro.Document | file | "c:\windows\shellnew\amipro.sam" |
| ... | | | |

*FIG. 12* object creation table 1300

| user object type | system object type | creation mode | argument (optional) |
|---|---|---|---|
| "Text Document" | txt.file | empty | |
| "Microsoft Word Document" | Word.Document.6 | file | "c:\windows\shellnew\winword.doc" |
| "Bitmap Image" | Paint.Picture | file | "c:\frame.bmp" |
| "Wave Sound" | SoundRec | data | 52 49 46 46 30 00 00 00 |
| "Microsoft Excel Worksheet" | Excel.Sheet.5 | file | "c:\windows\shellnew\excel.xls" |
| "Other Office Document" | Office.FileNew | command | "c:\msoffice\office\create_office.exe /n" |
| "AmiPro Document" | AmiPro.Document | file | "c:\windows\shellnew\amipro.sam" |
| "Memo" | Word.Document.6 | file | "c:\windows\shellnew\memo.doc" |
| ... | | | |

*FIG. 13*

METHOD AND SYSTEM FOR EFFICIENTLY CREATING A NEW FILE ASSOCIATED WITH AN APPLICATION PROGRAM

TECHNICAL FIELD

The present invention relates to the field of file management, and, more particularly, to the field of file creation.

BACKGROUND OF THE INVENTION

Modern computer systems typically can access and execute many application programs ("applications") that users employ to perform a wide variety of tasks. Examples of applications include word processing programs, which create and modify data files that primarily contain textual information, and spreadsheet programs, which create and modify data files that primarily contain numbers and formulas used in mathematical calculations. Such data files are sometimes called "objects," and are associated with their applications via system object types that uniquely identify applications within the computer system. Some operating systems store an object's system object type directly in the object, or in a file information block associated with the object by the file system. Other operating systems reflect an object's system object type by maintaining a table that maps from filename extensions to system object types, and by maintaining as part of the object's filename the filename extension mapped to from the object's system object type. In either case, each object has associated with it a system object type identifying its application. Operating systems also typically maintain a table mapping from system object types to commands for invoking the associated application, so that an operating system is able to invoke an application when the user issues an instruction to open an object having the system object type for the application. For example, if a user selects for opening an object associated with a word processing program via its system object, the operating system launches the word processing program in order to open, display, or manipulate the object.

There are generally multiple applications which can perform the same, or overlapping, tasks. For example, there are numerous competing word processing applications which each allow the user to create and modify textual objects. While a particular word processing application might include a differentiating functionality that is not shared by other competing word processing applications (such as the ability to create and print sheets of labels), there are overlapping functionalities that are generally shared by all word processing applications. A typical computer system can access and execute multiple applications which can perform a particular task, such as multiple word processing applications available to perform the task of creating a new textual object.

When a computer system user wants to accomplish a new task, the user must typically perform several steps before work on the task can commence. These steps include identifying available applications which provide the functionality to accomplish the task, selecting a particular application with which to accomplish the task, locating the application, executing the application, creating a new object in which the application can store task-specific information, and saving the new object in a desired location with a specified name. While these steps can be time-consuming even in ideal circumstances, there are several common factors related to current computer systems that exacerbate the time and complexity associated with accomplishing these steps.

One factor which increases the time and complexity of both saving files and identifying and locating applications is the multitude of available locations for applications and files to be stored in a typical computer system. In a typical computer system, the files are organized in a hierarchical file system. The hierarchical file system corresponds to the contents of one or more storage devices, such as a hard disk drive, and comprises an inverted tree of logical directories, with a root directory at the highest level. The root directory may contain applications and objects. The root directory may further have subdirectories. Each subdirectory can similarly contain applications and objects, and may similarly have its own subdirectories. Each directory is thus a distinct location where an application or object can reside. The hierarchy of directories within directories can generally continue in this manner indefinitely.

Each computer system commonly has multiple accessible information stores, the contents of which are represented within the computer system's file system hierarchy. There will often be multiple hard disks, each with multiple partitions, for each computer system. Additionally, each computer system typically has at least one floppy drive, which can sequentially read any number of floppy disk information stores. It is also becoming increasingly common for computer systems to have local information storage repositories other than hard disks or floppy disks. The types of these repositories can include CD-ROMs, digital audio tape (DAT) drives, flash RAMs, and many others. Each computer system will also commonly be part of a network of other computer systems. Each computer system on the network can generally access applications and objects that reside on the information stores locally connected to other computer systems on the network. The extensiveness of computer system storage capacity, and therefore of typical file system hierarchies can make a formidable task to locate a particular file within a file system hierarchy.

Within a file system hierarchy, the user may typically view the contents of one directory at a time (the "current directory"). The user can view the applications, objects and names of subdirectories located within the user's current directory. The user can also commonly "move" up the tree structure of the file system to the parent directory of the current directory, or down the tree structure to any subdirectory of the current directory, making the directory moved to the current directory and displaying its contents in place of those of the former current directory.

Thus, when the user begins a new task by identifying and attempting to invoke an application, the process can be time-consuming and frustrating. Because file system hierarchies typically contain a large number of directories, it is unlikely that the user's current directory on the current information store will contain the desired application. While it is possible for many or all of the applications to be grouped together within a specified subportion of the available locations, this is not often the case. Moreover, even if the user knows the exact location of the application within the filesystem hierarchy, it can be laborious and time-consuming to move to the correct subdirectory that is the location of the application so that the application can be invoked. If the user does not know the exact location of the application, then generally the user must search through various subdirectories in an attempt to locate the application.

Another factor which further complicates the problem of identifying and locating available applications is the common practice of multiple users sharing a particular computer system at different times, and of a particular user to utilize multiple computer systems at different times. These practices can produce the undesirable situation in which a particular user of a particular computer system is not only unaware of the locations of the available applications, but does not even know what applications are accessible from the computer system.

The process of creating a new object, which is generally the next step if the user succeeds in locating and invoking an application, is another factor which typically complicates the initiation of a new task. It is common for applications to require that any work done by a user be associated with a object in which the application can store the information generated from the work completed. Each application typically allows the user to create and save a new object or to open a previously created object. For a new task, the user will generally create a new file. In order to save the object, the user must specify to the application the exact location for the new file within some directory. While some applications maintain a default directory, it is rare that the default for the application is the directory where the user would like to store the new object. Thus, the user is required to select an information store and then traverse the hierarchical directory structure to reach the desired location. Only after completing this process is the user finally able to begin using the application to accomplish the initially identified task.

An additional consequence of the complexities related to accomplishing a new task is that when given a new task to perform, users generally will not focus on the task itself. Faced with a multitude of available applications, many with unknown locations, it is common for users to focus on the relatively few applications which the user generally utilizes rather than the nature of the task to be performed. In this way, the users often attempt to force a familiar application to perform a task for which it is not well suited, rather than focus on the optimal method of performing a task.

Alternately, if a user desires to accomplish a task that is directly associated with the hierarchical file system rather than with a particular application, the user generally accesses the operating system itself to accomplish this task. For example, if the user wishes to create an new subdirectory or a new link from one directory to a object or application in another directory, the user typically invokes some function specific to the operating system of the computer system to accomplish the task. The user generally invokes a separate function for each available file system task. In order to accomplish the task, the user must locate the appropriate function that will effect the desired goal and then execute the function.

SUMMARY OF THE INVENTION

In a preferred embodiment, an object creation facility ("the facility") is included as part of the operating system. The facility enables a user to quickly create a new object associated with an application from the operating system's shell without using the application with which the created object is associated. In response to a request from the user to create a new object, the facility displays a list of user object types for which an object may be created. When the user selects a user object type, the facility retrieves from an object creation table object creation information that specifies how to create a new object of the selected user object type. The facility then uses the retrieved object creation information to create a new object of the user object type selected by the user in a current directory within the file system hierarchy. The current directory may be any arbitrary directory whose contents are presently being viewed, or may be a special "desktop" directory, whose contents are displayed in the background of the screen in an area called the "desktop." When a new application is installed with which objects of a new type may be associated, an entry is preferably added to the object creation table containing object creation information for objects of the new type. The object creation table may preferably contain multiple entries corresponding to a single application, thereby enabling the creation of objects of multiple user object types having different creation information but the same system object type, therefore associated with the same application. In a further preferred embodiment, the object creation table is preferably pre-loaded to contain entries for object types associated with the application programs that have not yet been installed, thereby relieving the need of the user or the application to add such an entry to the object creation table when the application is later installed. In a further preferred embodiment, the user may modify the object creation table to add or delete entries, or to modify entries to change object type names or object creation information.

BRIEF DESCRIPTION OF THE DRAWINGS

FIG. 4 is a table diagram showing the contents of a sample object creation table.

FIG. 5 is a table diagram showing the contents of a sample system object type table.

FIG. 8 is a table diagram showing the contents of the sample object creation table after a user has deleted an entry.

FIG. 10 is a table diagram showing the contents of the sample object creation table after the user has added an entry.

FIG. 12 is a table diagram showing the contents of the sample object creation table after the user has modified an entry.

FIG. 13 is a table diagram showing the contents of the sample object creation table after the user has edited a new entry having an existing system object type.

DETAILED DESCRIPTION OF THE INVENTION

Figure 1:
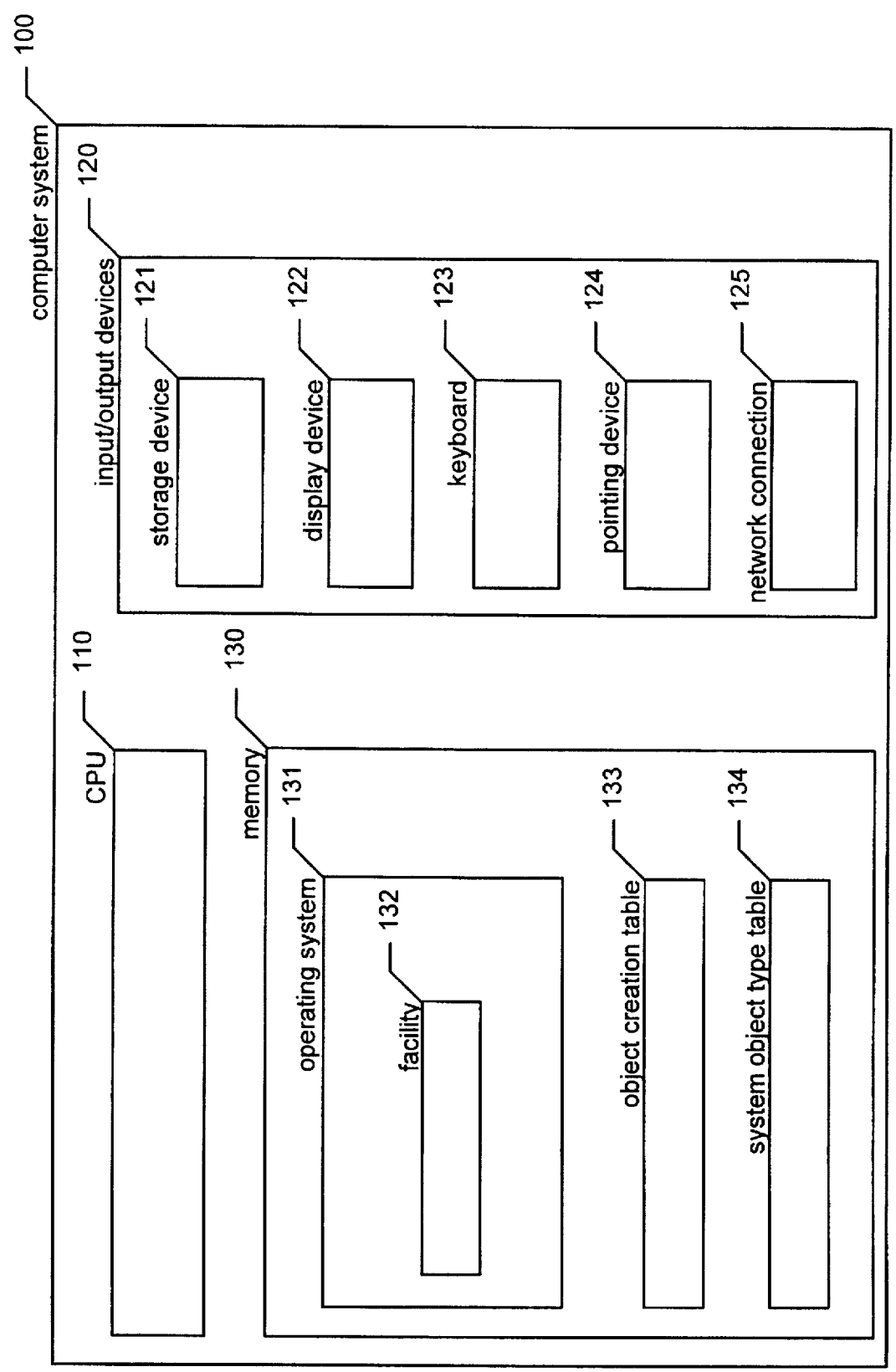
FIG. 1 is a high-level block diagram of the general-purpose computer system upon which the facility preferably operates.

A method and system for creating a new object associated with an application program under the control of an operating system is provided. Because the objects created according to the present invention are preferably implemented as files, the terms "object" and "file" are used interchangeably herein. It will be understood by one skilled in the art, however, that the present invention could be straightforwardly applied to objects having various other implementations.

In a preferred embodiment, an object creation facility ("the facility") is included as part of the operating system. The facility enables a user to quickly create a new object associated with an application from the operating system's shell without using the application with which the created object is associated. In response to a request from the user to create a new object, the facility displays a list of user object types for which an object may be created. When the user selects a user object type, the facility retrieves from an object creation table object creation information that specifies how to create a new object of the selected user object type. The facility then uses the retrieved object creation information to create a new object of the user object type selected by the user in a current directory within the file system hierarchy. The current directory may be any arbitrary directory whose contents are presently being viewed, or may be a special "desktop" directory, whose contents are displayed in the background of the screen in an area called the "desktop." When a new application is installed with which objects of a new type may be associated, an entry is preferably added to the object creation table containing object creation information for objects of the new type. The object creation table may preferably contain multiple entries corresponding to a single application, thereby enabling the creation of objects of multiple user object types having different creation information but the same system object type, therefore associated with the same application. In a further preferred embodiment, the object creation table is preferably pre-loaded to contain entries for object types associated with the application programs that have not yet been installed, thereby relieving the need of the user or the application to add such an entry to the object creation table when the application is later installed. In a further preferred embodiment, the user may modify the object creation table to add or delete entries, or to modify entries to change object type names or object creation information.

The object creation information stored in the object creation table for creating a new object of a particular type, preferably specifies one of four different creation modes. An "empty" creation mode specifies that the created object should have no contents. A "data" creation mode specifies that the created object should have contents corresponding to data stored within the object creation information. A "file" creation mode specifies that the created object is to be a copy of a specified template object. Finally, a "command" creation mode specifies executing a specified command that creates the created object. The object creation information is stored in the object creation table preferably also specifies a system object type to be assigned to the created object. Assignment of the system object type to the created object preferably enables the operating system to launch the application program to open the created object when the user subsequently requests to open the created object.

FIG. 1 is a high-level block diagram of the general-purpose computer system upon which the facility preferably operates. The computer system 100 contains a central processing unit (CPU) 110, input/output devices 120, and a computer memory (memory) 130. Among the input/output devices 120 is a storage device 121, such as a hard disk drive; a display device 122, such as a video monitor; a keyboard 123; a pointing device 124, such as a mouse; and a network connection 125, through which the computer system 100 may communicate with other connected computer systems (not shown). The memory 130 preferably contains an operating system 131, which preferably executes on the CPU 110 and includes the new file creation facility (the facility) 132. The memory 130 further contains an object creation table 133 and a system object type table 134 both used by the facility 132. While the facility is preferably implemented on a computer system configured as described above, one skilled in the art will recognize that it may also be implemented on computer systems having different configurations.

The facility is preferably integrated with the operating system's graphical user interface, or "shell," enabling the user to quickly create an object while utilizing other shell services. The user may issue a command to invoke the facility in several ways. FIGS. 2A–E are screen diagrams showing the user using a context menu within a directory window to invoke the facilities. FIGS. 5A–E show the user using a context menu on the desktop to invoke the facility. FIGS. 6A–E show the user using a directory window pull-down menu to invoke the facility.

Figure 2A:
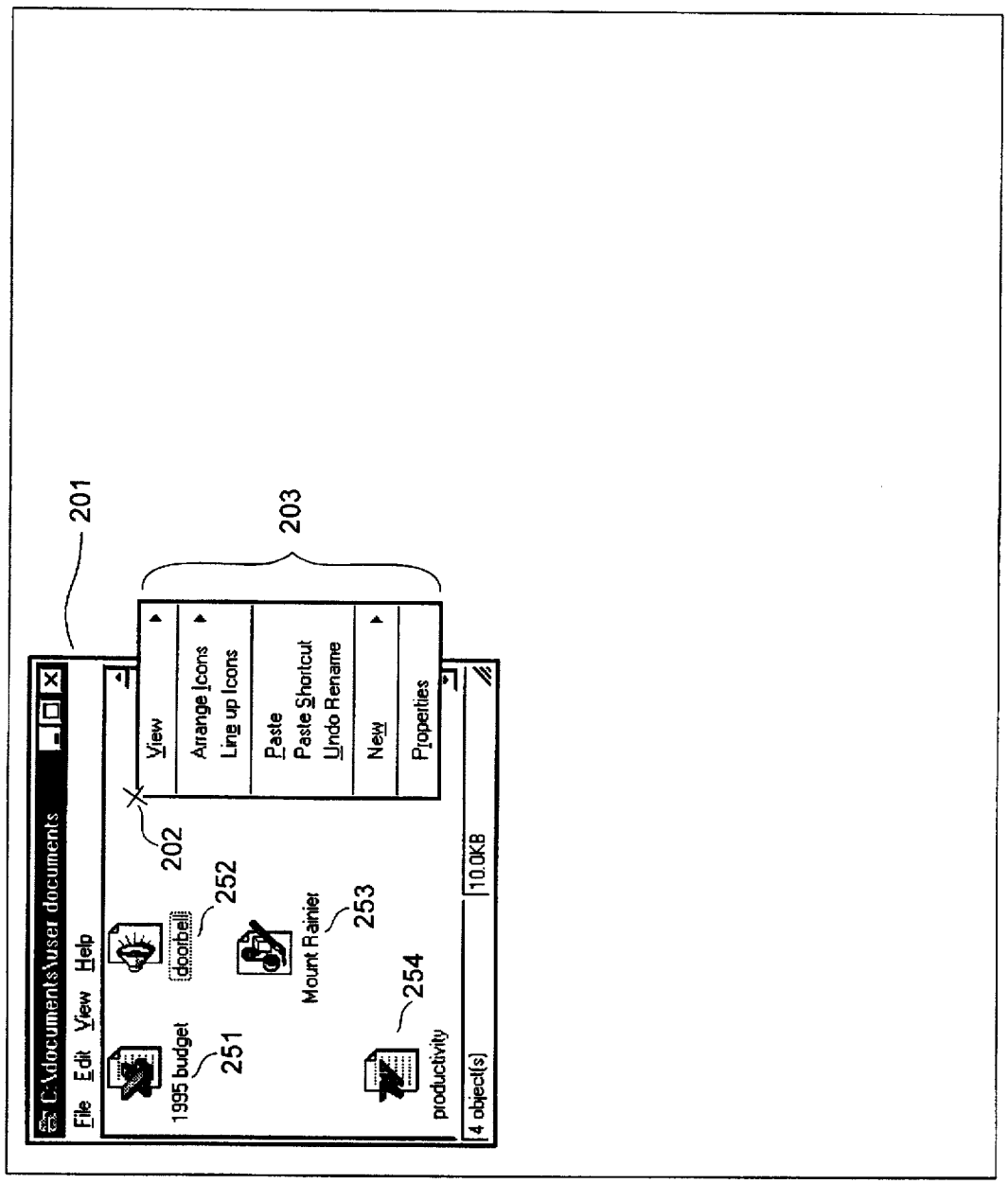
FIGS. 2A-E are screen diagrams showing the user using a context menu within a directory window to invoke the facility.

FIGS. 2A–E are screen diagrams showing the user using a context menu within a directory window to create a new Text Document object in the "C:\documents\user documents" directory. FIG. 2A shows the user using a context menu 203 within a directory window 201. The directory window 201 contains object indicators, or "icons," 251, 252, 253, 254, indicating that a "C:\documents\user documents" directory within the file system hierarchy contains corresponding objects. The user uses a context menu in conjunction with the directory window 201 by clicking a context menu button on the pointing device 124 when a pointing cursor controlled by the pointing device is at point 202 within the directory window 201. Invoking the facility in this way selects the directory of the directory window 201, the "C:\documents\user documents" directory, as the current directory in which the created object will be created.

Figure 2B:
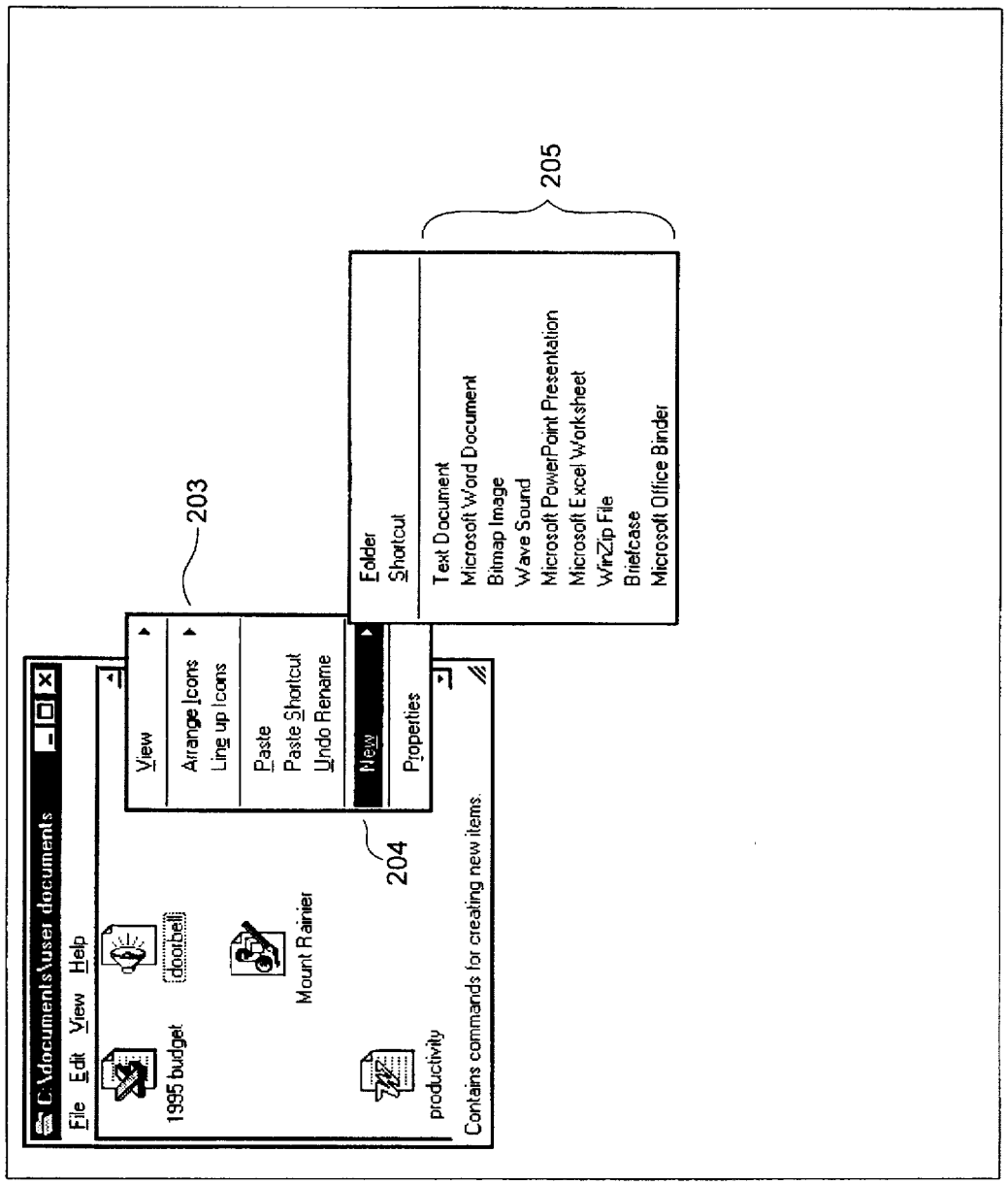
Figure 3:
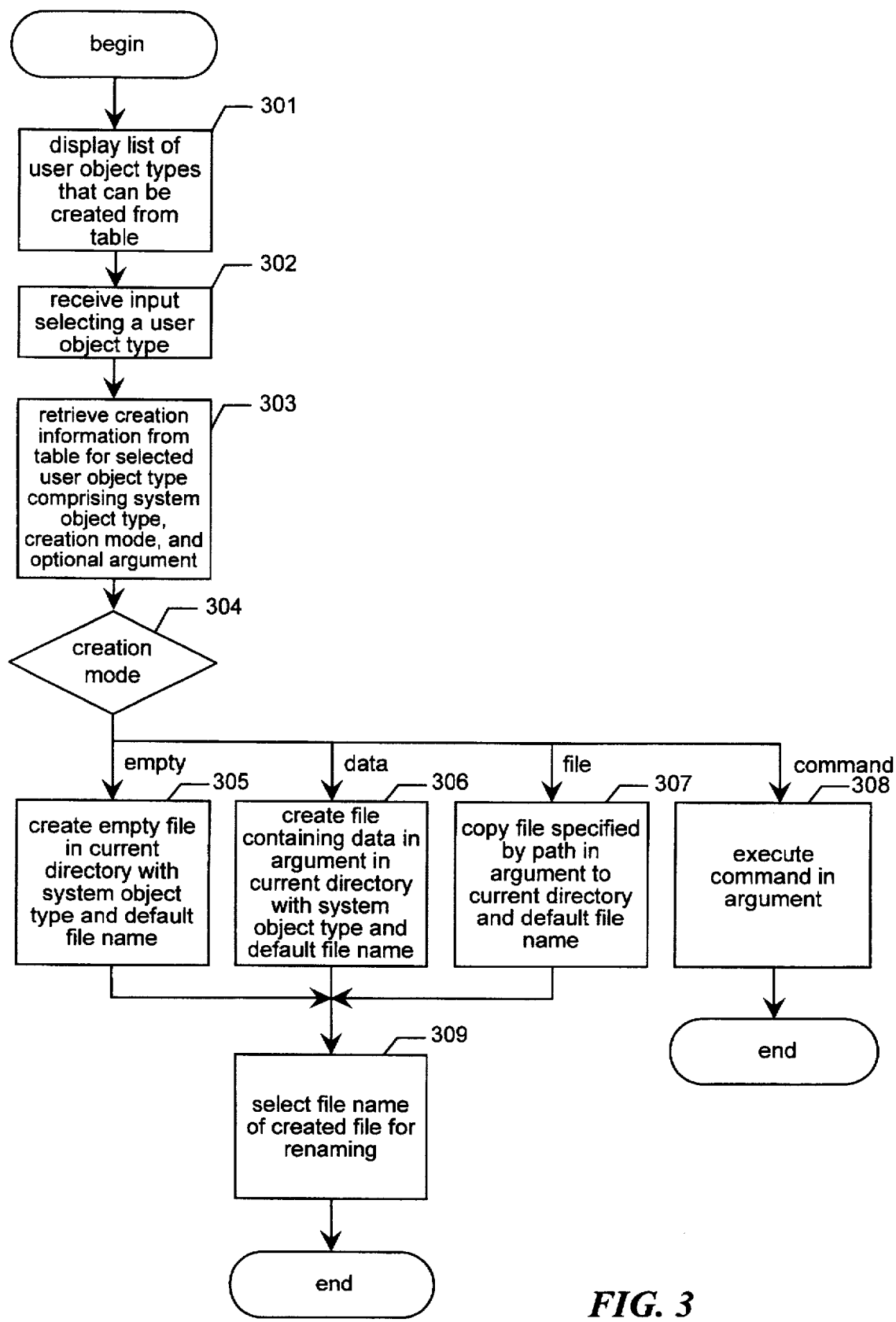
FIG. 3 is a flow diagram showing the steps preferably performed by the facility when it is invoked.

FIG. 2B shows the user selecting a "New" menu item 204 from the context menu 203 in order to invoke the facility. FIG. 3 is a flow diagram showing the steps preferably performed by the facility when it is invoked. As shown in FIG. 3, in step 301, the facility displays a list of user object types that can be created. The facility preferably performs step 301 by retrieving a list of user object types from the object creation table.

FIG. 4 is a table diagram showing the contents of a sample object creation table. The object creation table 400 is comprised of rows called entries, each divided into four columns. Each entry corresponds to a single type of object that the user can create. A user object type column 401 contains a string identifying the object type of the entry in a way that is comprehensible to a user ("user object type"). For example, the user object type of the first entry is "Text Document". A system object type column 402 contains a system object type that uniquely identifies the application that can be used to edit or otherwise open the created object. For example, the second entry has the system object type "Word.Document.6". Once the created object is created having the system object type, the facility is able to use a system object type table to map from the system object type of the created object to the command for launching the associated application.

FIG. 5 is a table diagram showing the contents of a sample system object type table, which maps from a system object type to a command for launching the application associated with the system object type. The system object type table 500 has an entry for each system object type. Each entry is divided into two columns. A system object type column 501 contains a mapped-from system object type. For example, the system object type of the second entry is "Word.Document.6". A command column 502 contains the command for launching the application associated with the system object type. For example, the command of a second entry is "C:\msoffice\winword\winword.exe".

Returning to FIG. 4, the object creation table 400 also contains a creation mode column 403 and an argument column 404. These columns contain object creation information used to create the object of the specified type, as discussed in greater detail below. The list of object types displayed in step 301 is retrieved from user object type column 401. In the preferred embodiment, the facility displays only those user object types whose system object types have entries in the system object type table 500. This ensures that the user does not create an object having a system object type for which no associated application program is installed, and which therefore cannot be opened. For the embodiment utilized in conjunction with the Microsoft® Windows® 95 operating system, the data comprising the object creation table and the system object type table is stored in and retrieved from a central data repository called the Registry.

Figure 2C:
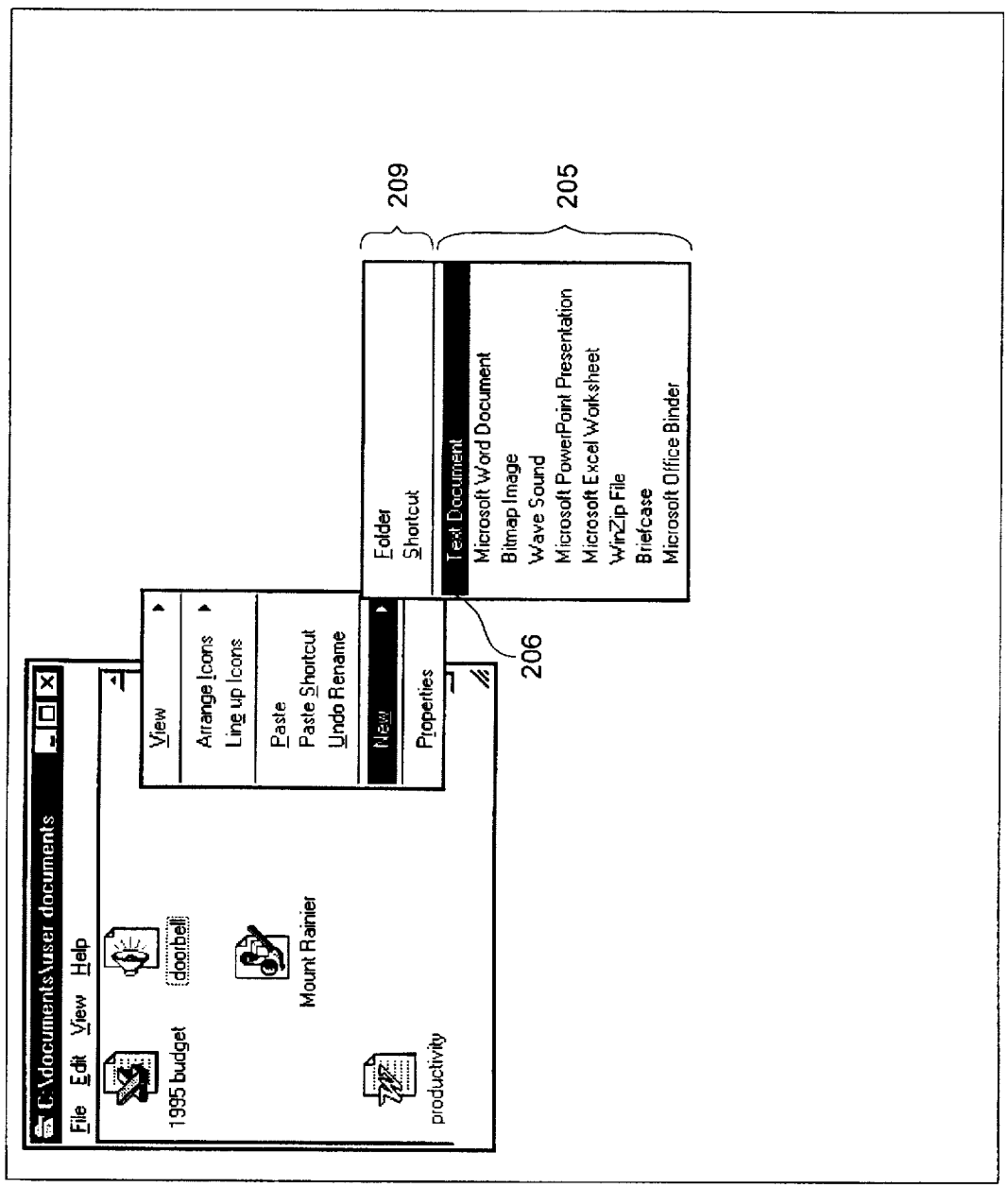

FIG. 2B shows the list of user object types 205 displayed by the facility in step 301. In a preferred embodiment, the facility also displays a list of user object types not associated with any application 209. In step 302, the facility receives input from the user selecting a user object type from the displayed list 205. FIG. 2C shows the user selecting the "Text Document" user object type 206 from the list of user object types 205.

In step 303, the facility retrieves creation information from the table for the selected user object type. The creation information consists of a system object type, a creation mode, and optionally an argument related to the creation mode. In step 304, the facility tests the creation mode for the selected user object type. Depending on the creation mode specified for the selected user object type, the facility continues in step 304, 305, 306 or 307 to create the created object in accordance with the creation information.

As discussed above, each user object type may have one of four different creation modes. The empty creation mode specifies that the created object should have no contents. The empty creation mode does not have any arguments. If the creation mode is the empty creation mode, then the facility continues in step 305 to create an empty file in the current directory having the system object type retrieved from the object creation table entry and a default file name. The default file name is preferably the concatenation of the word "New" with the user object type. If any object having this name already exists in the default directory, the facility preferably distinguishes the default file name by, for instance, appending a digit that makes the default name unique within the directory. For example, when creating a "Text Document" object, the facility would create an empty file having the "txt.file" system object type as shown in FIG. 4. The facility then continues at step 309.

The data creation mode specifies that the created object should have contents specified in its argument. If the creation mode is the data creation mode, the facility continues at step 306 to create a file containing the data in the argument in the current directory the file having the system object type retrieved from the object creation table entry and the default file name. For example, when creating an "Wave Sound" object the facility would insert the data "52 49 46 46 30 00 00" in an empty object as shown in FIG. 4. The created object would receive the system object type "SoundRec" and the default filename. The facility then continues in step 309.

The file creation mode specifies that the created object is to be a copy of a specified template object. The argument for the file creation mode is the file system path of the template object. If the creation mode is the file creation mode, then the facility continues at step 307 to copy the file specified by the path in the argument to the default file name in the current directory. For example, when creating a "Microsoft Word Document" the facility would copy the template file "C:\windows\filenew\winword.doc" to the default file name in the current directory as shown in FIG. 4. As a copy of the template file, which has the system object type "Word.Document.6", the created object would also have the system object type "Word.Document.6". The facility then continues in step 309.

The command creation mode specifies executing a command which creates the created object. The argument for the command creation mode is the file system path of the command to be invoked, and may be any command intelligible to the operating system. If the creation mode is the command creation mode, the facility continues at step 308 to execute the command occurring in the argument. For example, when creating an "Other Office Document" object, the facility would issue the command "C:\msoffice\office\createoffice.exe /n" as shown in FIG. 4. The steps shown in FIG. 3 then conclude.

Figure 2D:
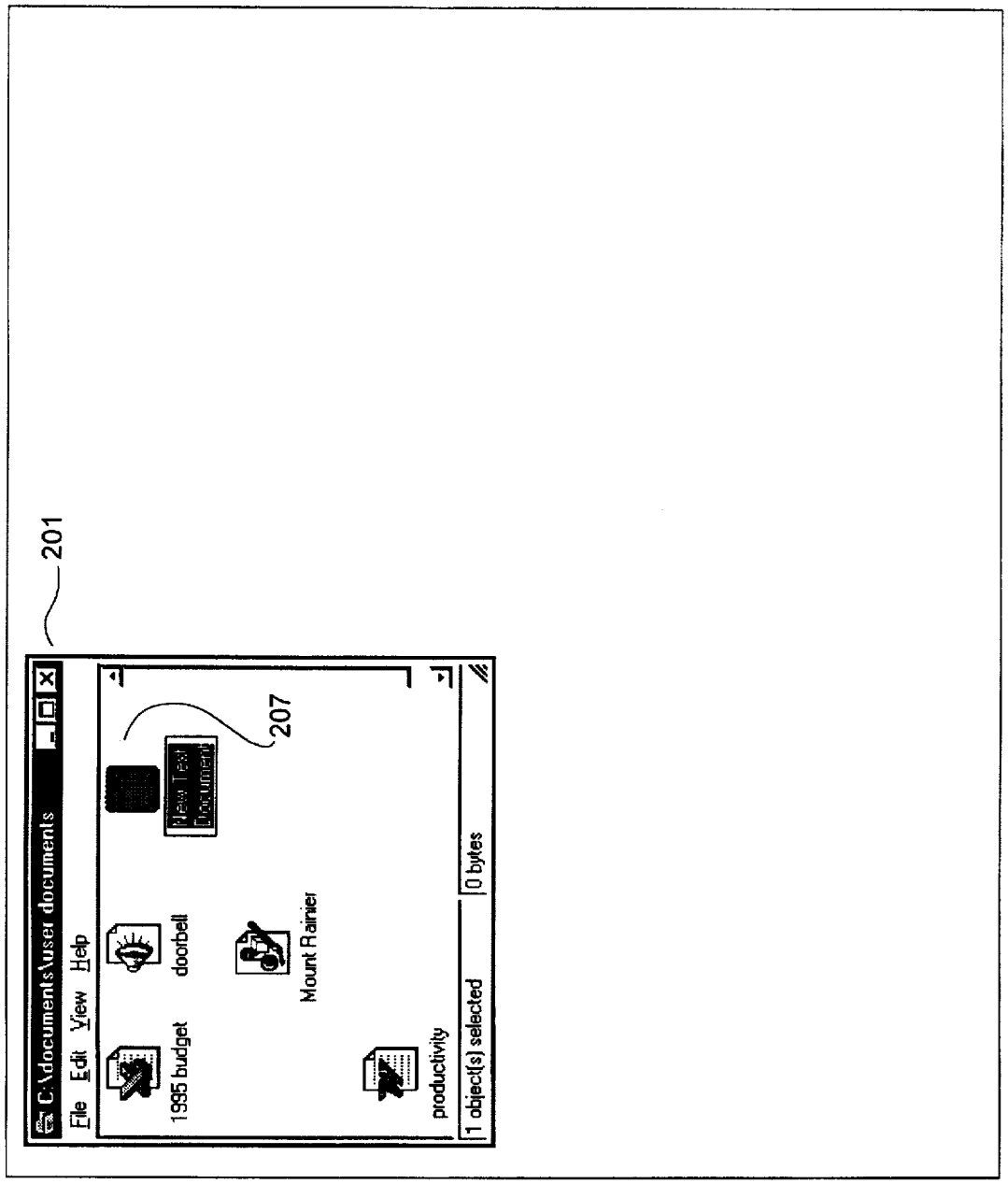

FIG. 2D shows the creation of the created object 207 in the directory window 201. It can be seen that the created object 207 has the default file name "New Text Document" in FIG. 2D. In step 309, the facility selects the file name of the created file for renaming. The user may subsequently type a new name for the created file, which will replace the default file name initially assigned to the created file. The steps shown in FIG. 3 then conclude.

Figure 2E:
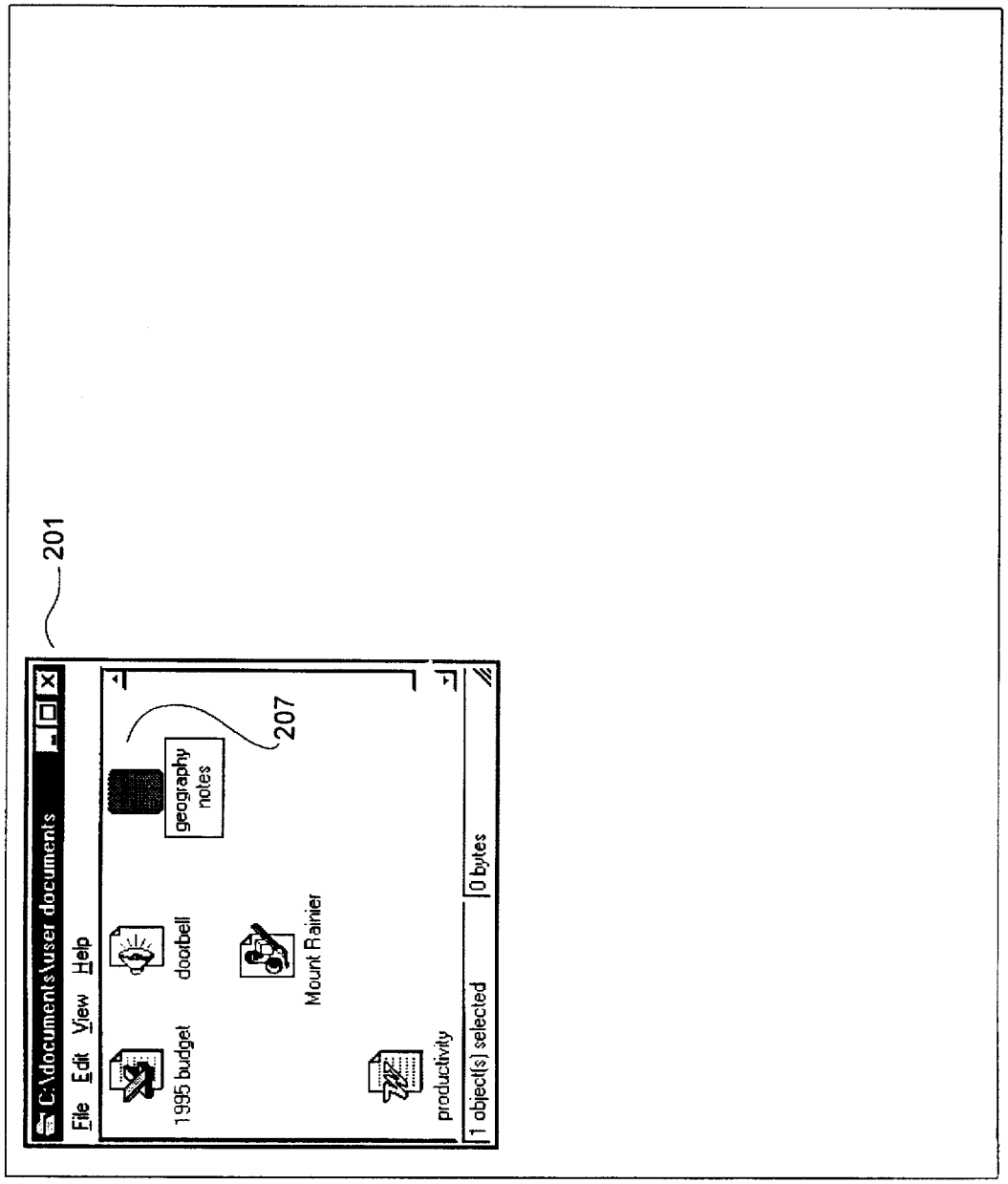

FIG. 2E shows that the user has renamed the created object 207 with the name "geography notes". At this point, the user may open the created object 207, thereby launching the associated application to display or edit the created object. In response, the facility determines that the created object 207 has the system object type "txt.file". The facility looks up the system object type "txt.file" in the system object type table to determine that the command for watching the associated application is "C:\windows\notepad.exe %1". The facility then issues that command to launch the associated application to open the created object 207.

Figure 6A:
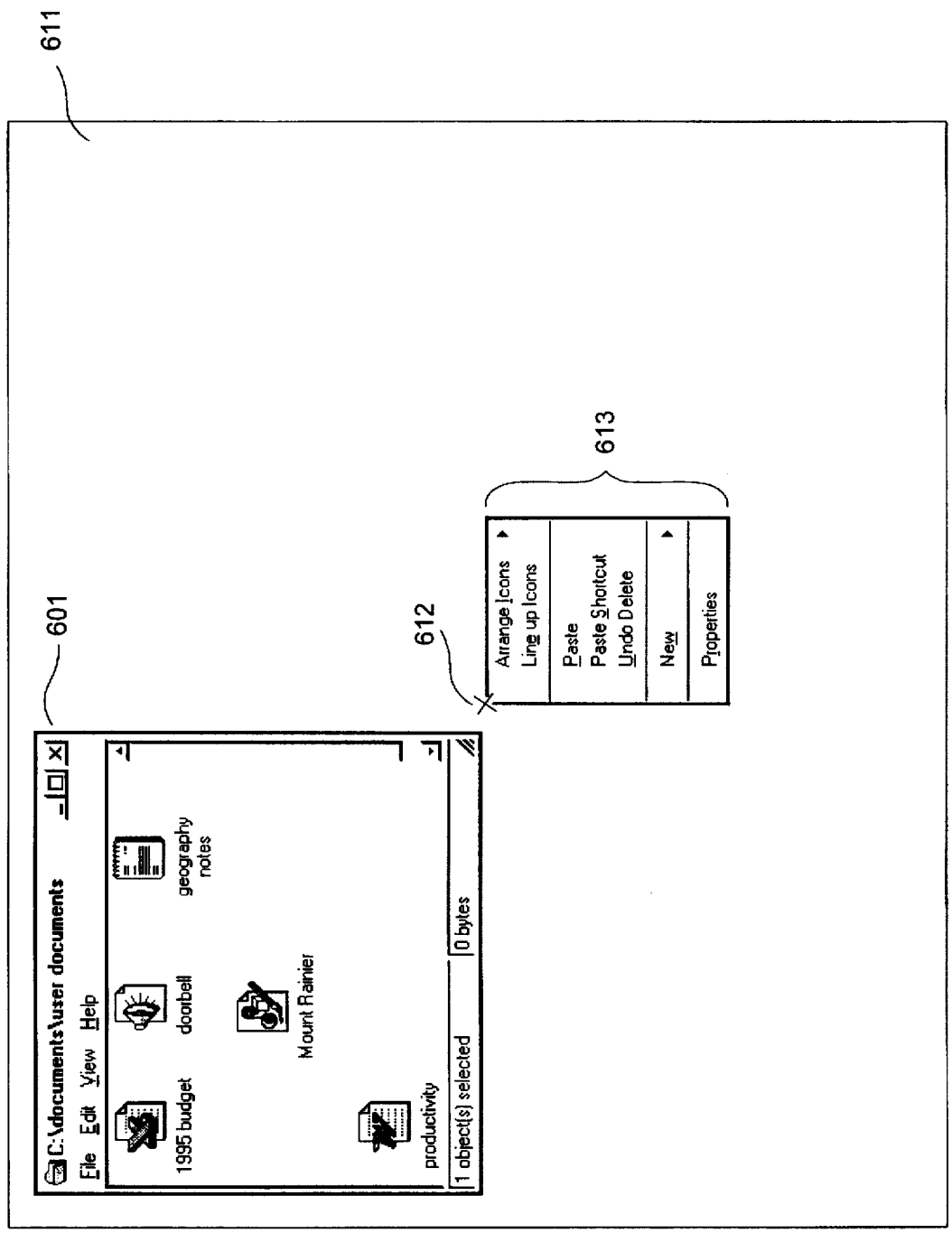
FIGS. 6A-E are screen diagrams showing the user using a context menu on the desktop to invoke the facility.

FIGS. 6A–E are screen diagrams showing the user using a context menu on the desktop to create a new "Microsoft Word Document" on the desktop. In a way similar to FIGS. 2A–E, FIGS. 6A–E show the user's invocation of the facility. FIG. 6A shows the user using a context menu in conjunction with the desktop 611 by clicking the context menu button on the pointing device 124 when the pointing cursor controlled by the pointing device is at point 612 within the desktop 611 and outside any directory windows, e.g., 601. Invoking the facility in this way selects the desktop as the current directory in which the created object will be created.

Figure 6B:
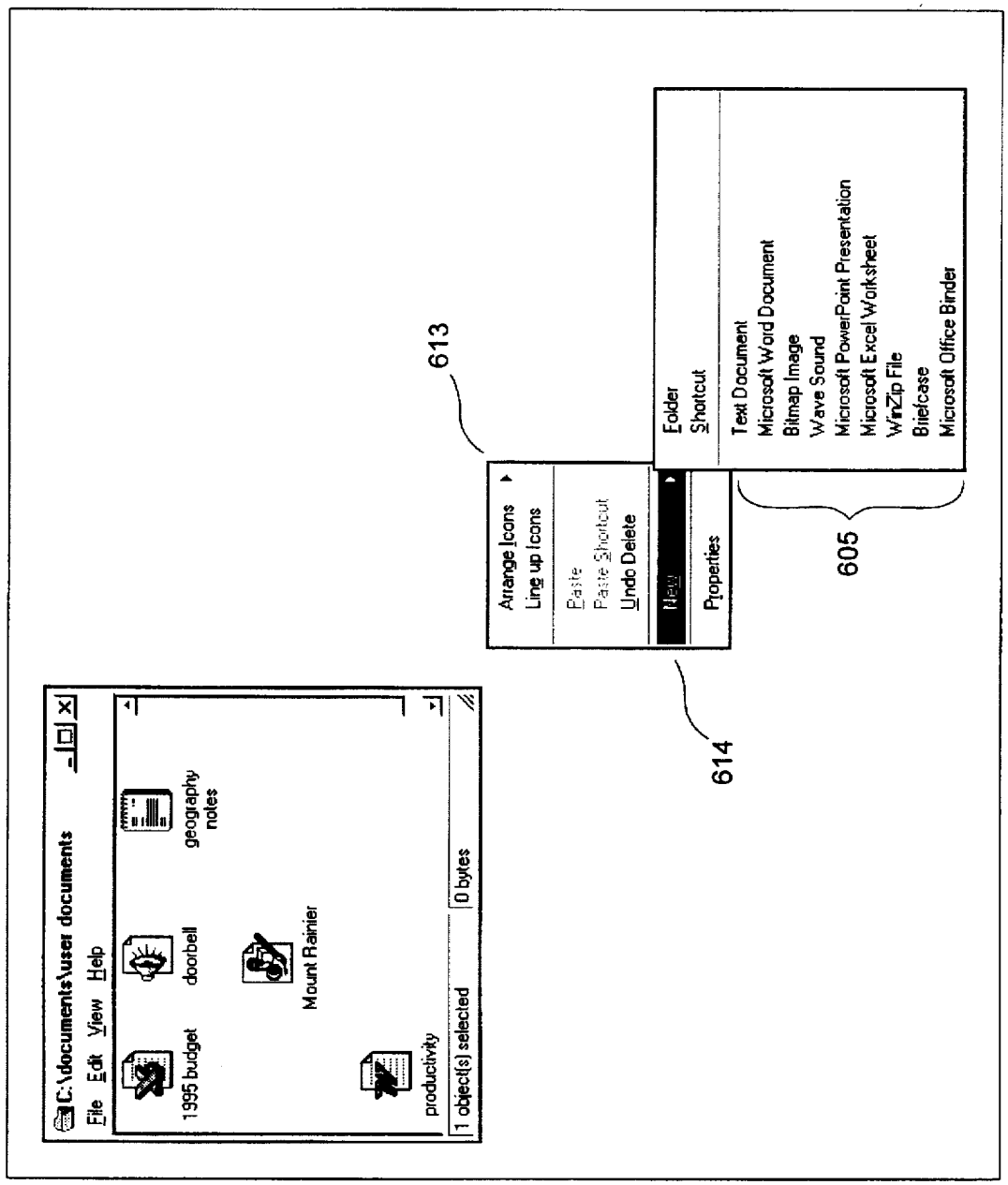

FIG. 6B shows the user selecting a "New" menu item 614 from the context menu 613 in order to invoke the facility. In response, the facility displays the list 605 of user object types that can be created.

Figure 6C:
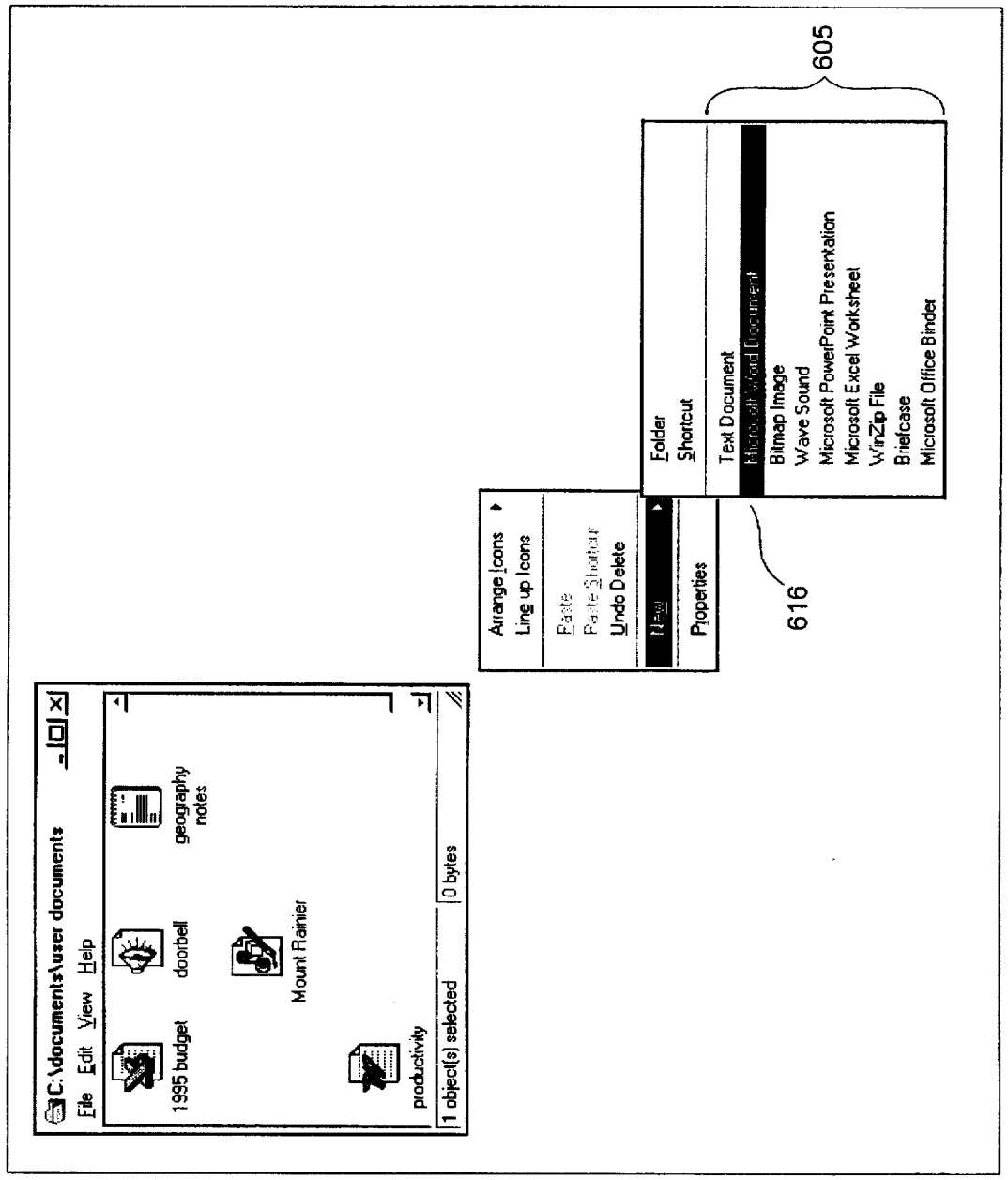

FIG. 6C shows the user selecting the "Microsoft Word Document" user object type 616 from the list of user object types 605.

Figure 6D:
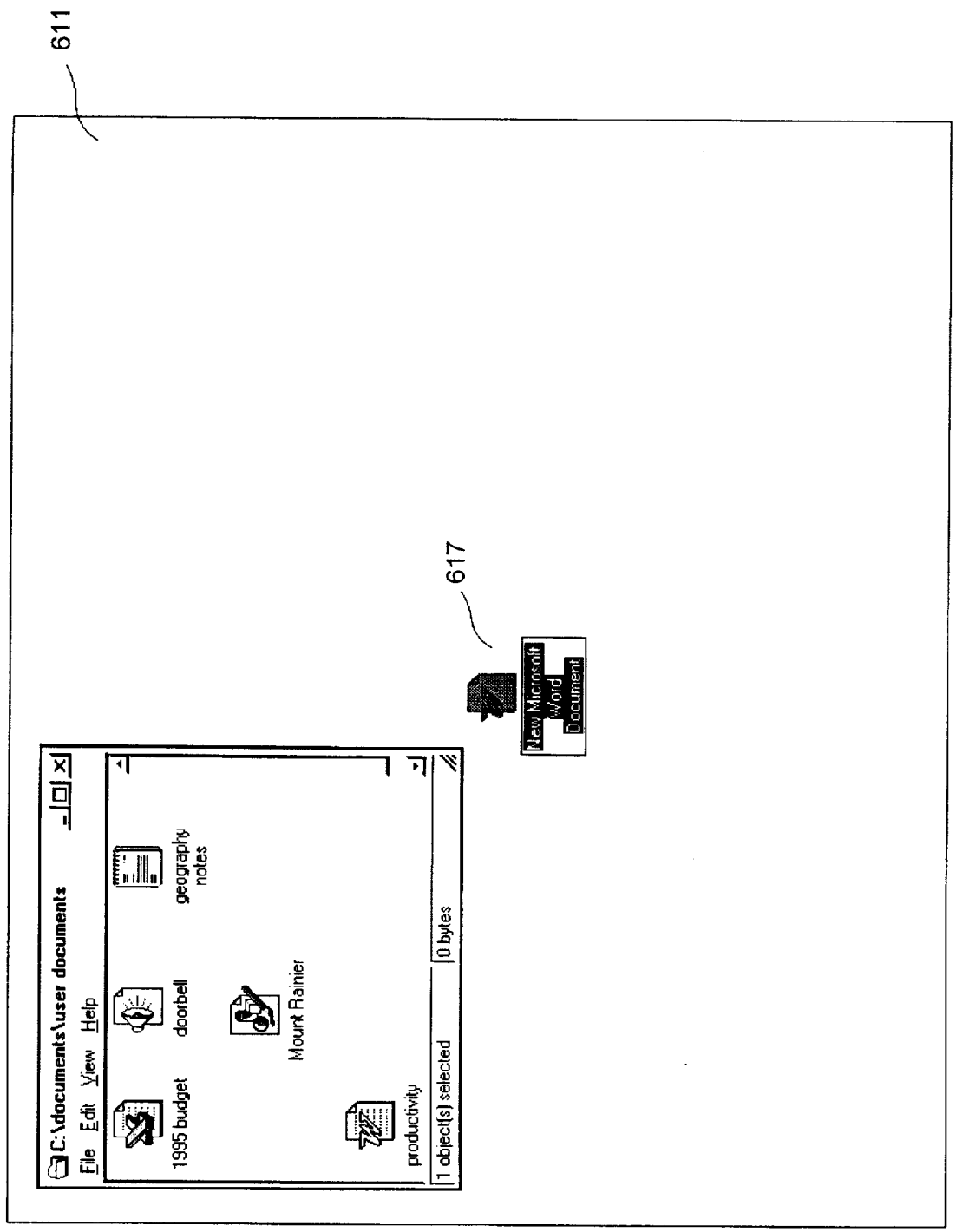

FIG. 6D shows the creation of the created object 617 on the desktop 611. It can be seen that the created object 617 has the default name "New Microsoft Word Document" in FIG. 6D.

Figure 6E:
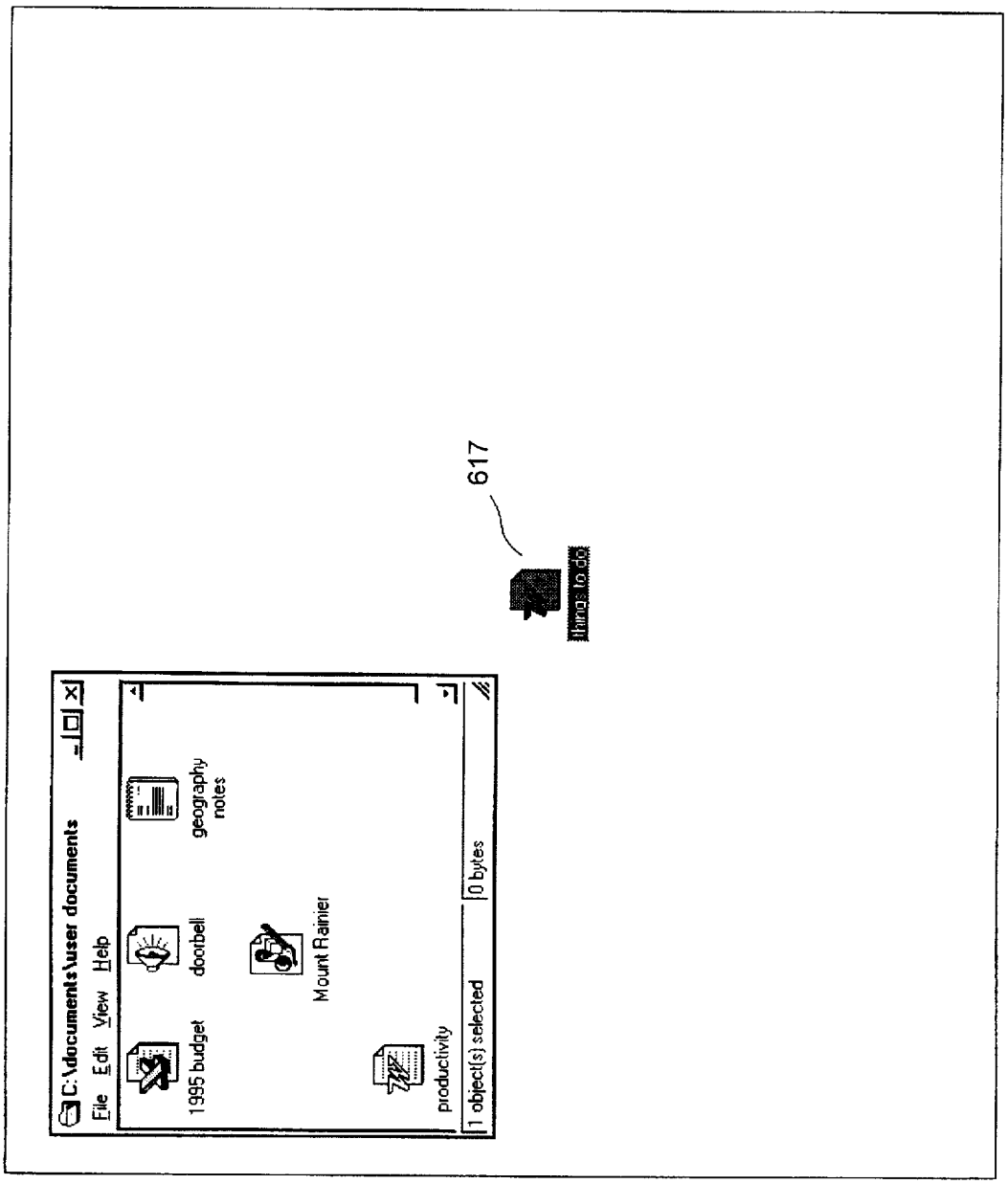

FIG. 6E shows that the user has renamed the created object 617 with the name "things to do". At this point, the user may open the created object 617, thereby launching the associated application to display or edit the created object.

Figure 7A:
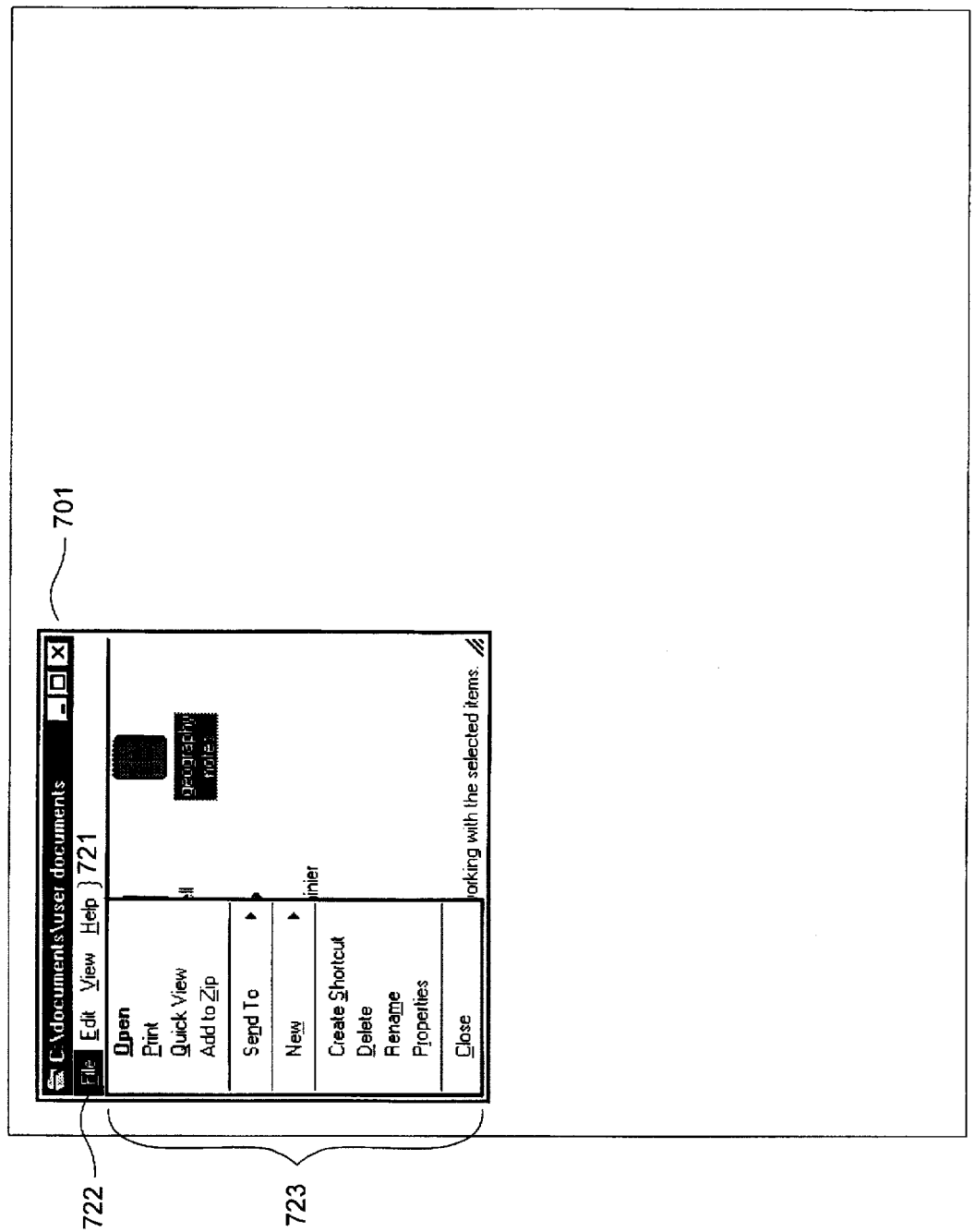
FIGS. 7A-E are screen diagrams showing the user using a pull-down menu of a directory window to invoke the facility.

FIG. 7A–E are screen diagrams showing the user using a directory window pull-down menu to invoke the facility. When the facility is invoked in this way, the directory of the directory window is the current directory in which the created object is created. In a way similar to FIGS. 2A–E and FIGS. 6A–E, FIGS. 7A–E show the user's invocation of the facility. FIG. 7A shows a directory window 701 before the "C:\documents\user documents" directory. The directory window 701 has a menu bar 722, which contains the names of several pull-down menus. The user has selected the name 722 of the "File" pull-down menu, causing the display of the File pull-down menu 723.

Figure 7B:
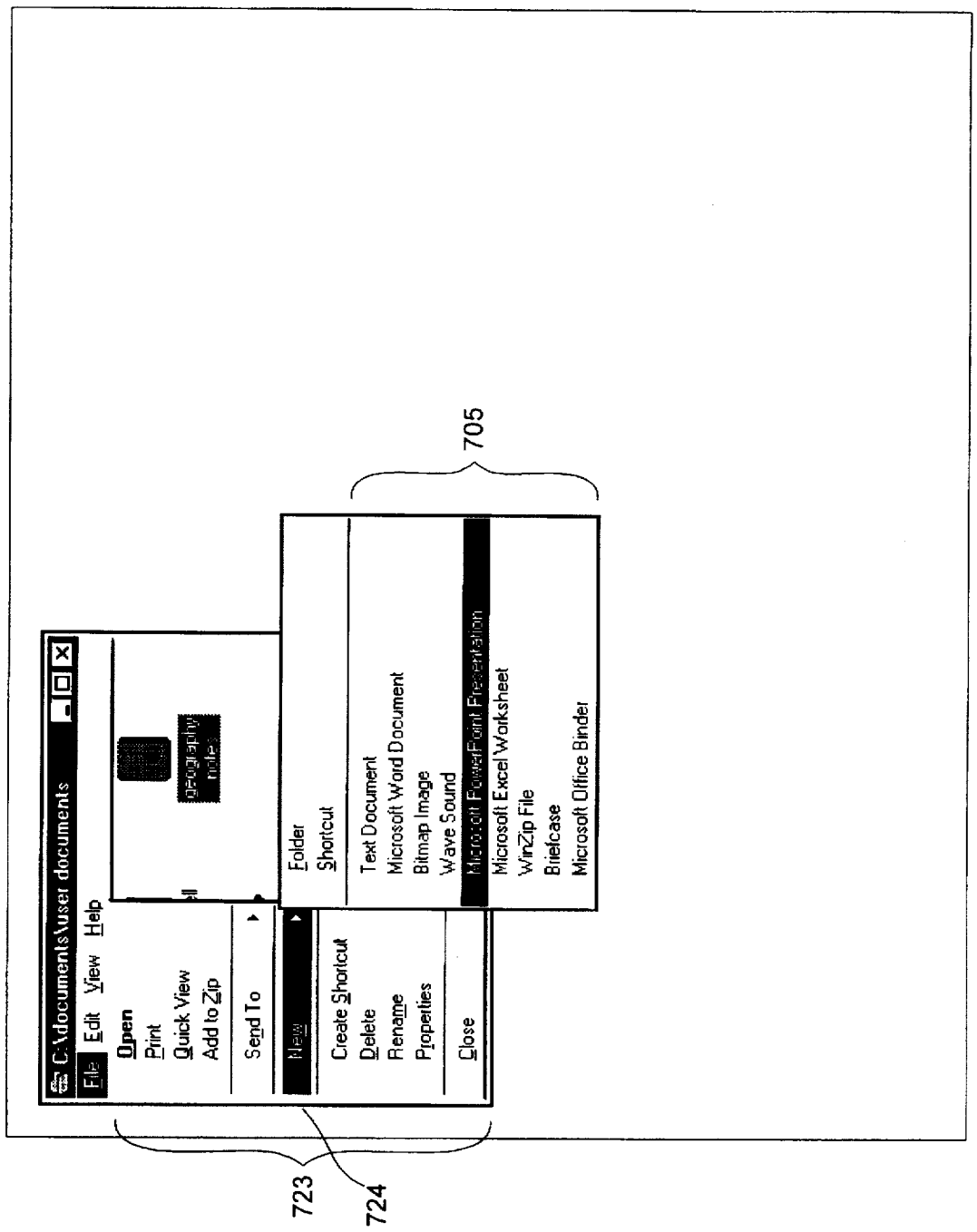

FIG. 7B shows the user selecting a "New" menu item 724 from the pull-down menu 724. In response, the facility displays a list of user object types that can be created 705.

Figure 7C:
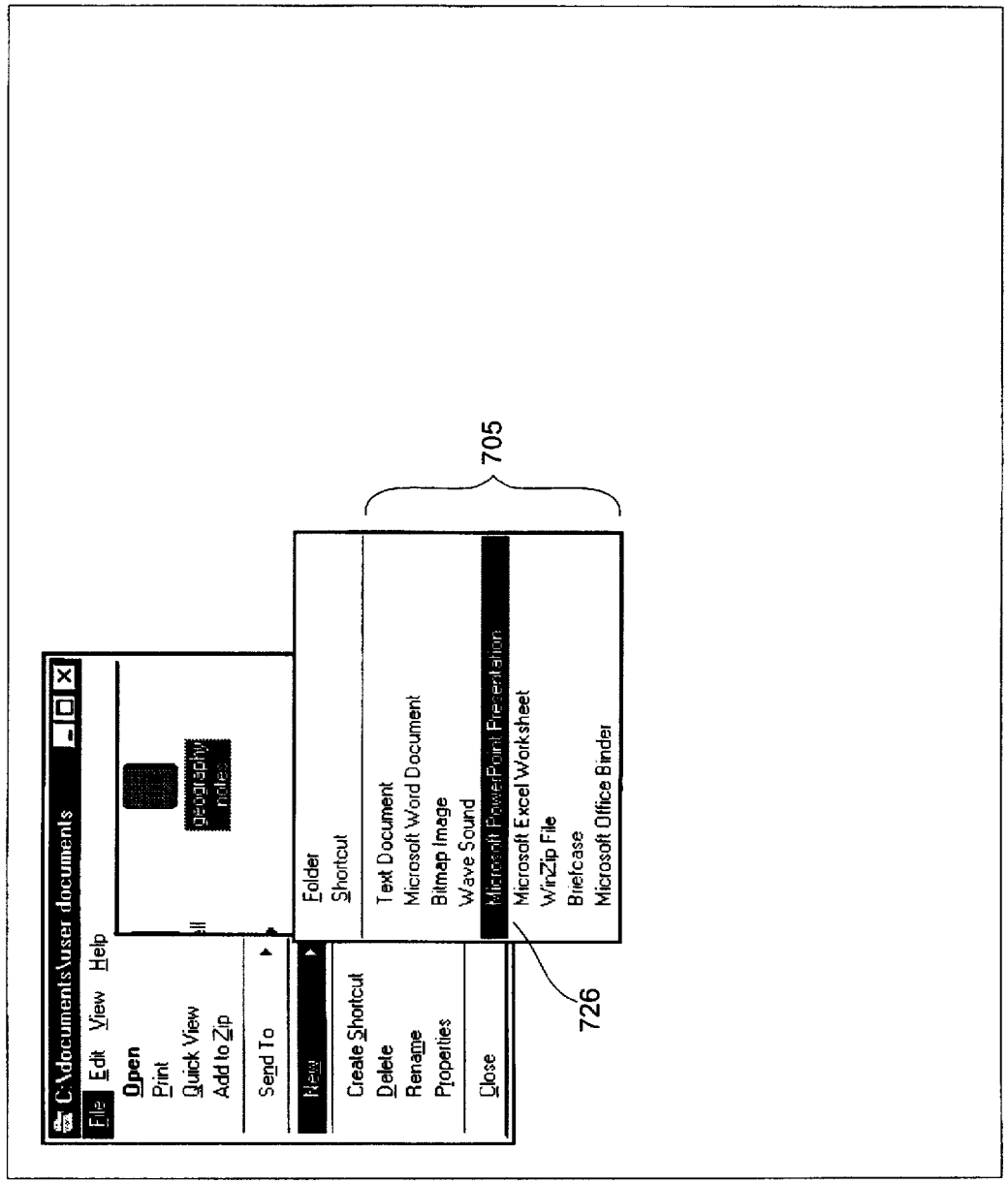

FIG. 7C shows the user selecting the "Microsoft PowerPoint Presentation" user object type 727 from the list of user object types 705.

Figure 7D:
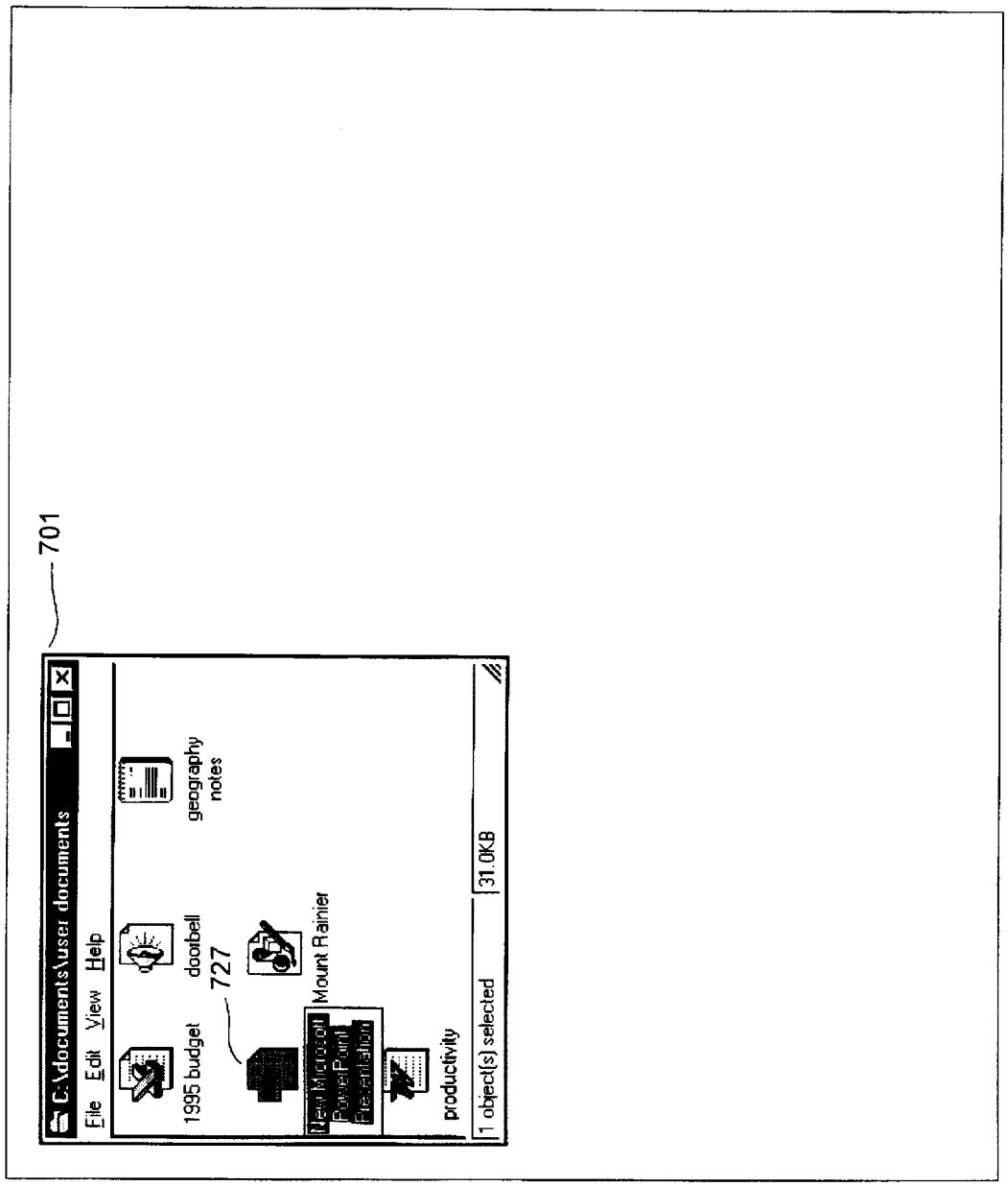

FIG. 7D shows the creation of the created object 727 in the directory window 701 corresponding to the "C:\documents\user documents" directory. It can be seen that the created object 727 has the default name "New Microsoft PowerPoint Presentation" in FIG. 7D.

Figure 7E:
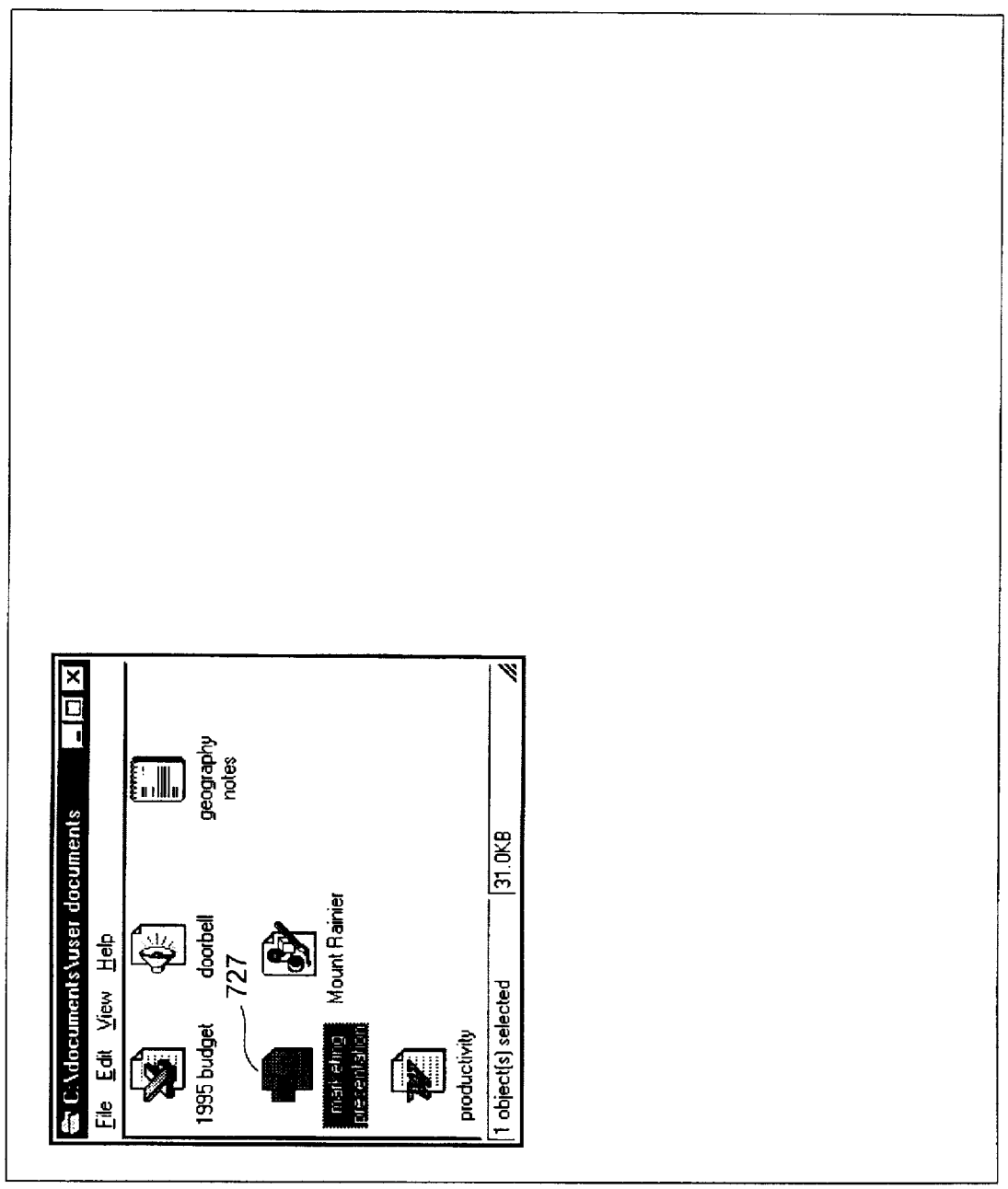

FIG. 7E shows that the user has renamed the created object 727 with the name "marketing presentation". At this point, the user may open the created object 727, thereby launching the associated application to display or edit the created object.

The sample object creation table shown in FIG. 4 is preferably provided with the facility as part of the operating system, containing entries for user object types having system object types associated with application programs that have not yet been installed, thereby relieving the need of the user or the application to add such an entry to the object creation table when the application is later installed. The object creation table may subsequently be modified, either by new applications during their installation or by the user. The user may modify the object creation table by deleting an existing entry, adding a new entry, or modifying an existing entry. User modifications may result in several user object type entries that have the same system object type. This allows objects of multiple user object types, having differing creation information and therefore differing contents, to be associated with the same application.

Figure 9:
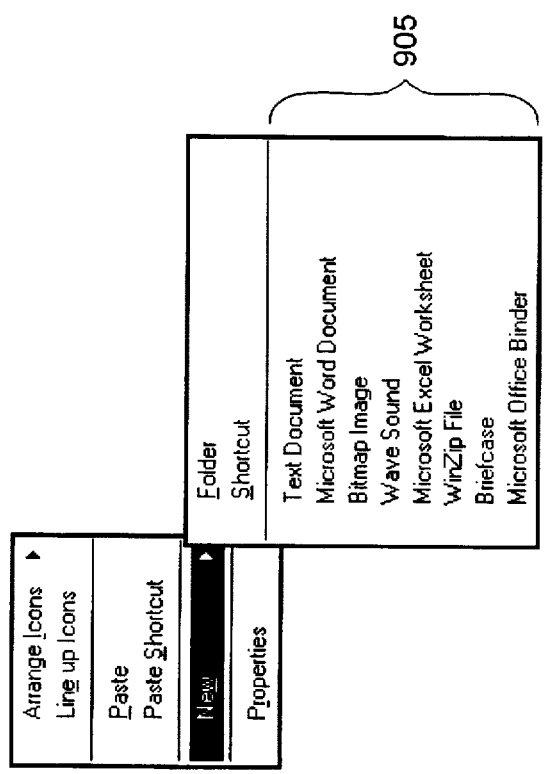
FIG. 9 is a screen diagram showing the list of available object types after the user has deleted an entry from the sample object creation table.

FIG. 8 is a table diagram showing the contents of the sample object creation table after a user has deleted an entry. The figure shows that the user has deleted the entry in after creation table 400 for the "Microsoft PowerPoint Presentation" user object types. As a result, when the facility subsequently displays the list of available user object types, the list will not include the "Microsoft PowerPoint Presentation" user object type. FIG. 9 is a screen diagram showing the list of available user object types after the user has deleted an entry from the sample object creation table. It can be seen that the displayed list of available user object types 905 does not include the "Microsoft PowerPoint Presentation" user object type that occurs in list 205 (FIG. 2).

Figure 11:
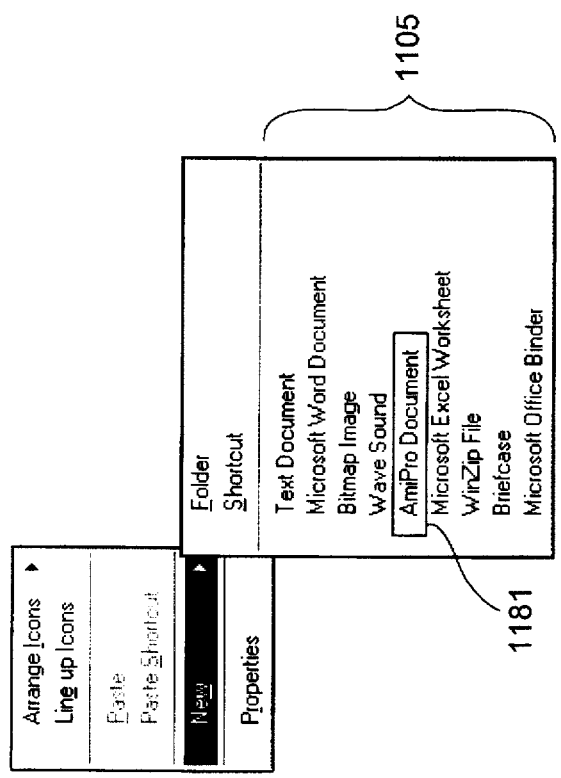
FIG. 11 is a display diagram showing the list of available object types after the user has added an entry to the sample object creation table.

FIG. 10 is a table diagram showing the contents of the sample object creation table after the user has added an entry. The figure shows that the user has added an entry for an "AmiPro Document" user object type. As a result, when the facility subsequently displays a list of available user object types, the list will include the "AmiPro Document" user object type. FIG. 11 is a display diagram showing the list of available user object types after the user has added an entry to the sample object creation table. It can bee seen that the displayed list of available user object types 1105 includes the "AmiPro Document" user object type 1181, which does not occur in list 205 (FIG. 2).

The user may also modify an entry in the object creation table to change the way in which the facility creates new objects of the entry's type. For example, the user may modify an entry to change the creation mode for a particular object type. FIG. 12 is a table diagram showing the contents of the sample object creation table after the user has modified an entry to change the creation mode of a particular object type. The object creation table 1200 contains a modified entry for the "Bitmap Image" user object type. In FIG. 4, the creation mode of this entry was the empty creation mode, causing the facility to create new "Bitmap Image" objects by creating empty objects. FIG. 11 shows that the user has changed the creation mode of the "Bitmap Image" user object type to the file creation mode and specified a pathname to a template file as the argument for the "Bitmap Image" object type. In response, when creating a new "Bitmap Image" object, the facility will do so by copying the specified template file.

FIG. 13 is a table diagram showing the contents of the sample object creation table after the user has added an entry for a new user object type having an existing system object type. The figure shows that the user has added an entry for a "Memo" user object type. The added entry has the same system object type as the entry for the "Microsoft Word Document" user object type. The added entry, however, specifies a different template file in its argument than does the entry for the "Microsoft Word Document" user object type. Objects created by the facility for the "Memo" and "Microsoft Word Document" user object types will therefore be opened using the same application but have different contents.

While this invention has been shown and described with reference to preferred embodiments, it will be understood by those skilled in the art that various changes or modifications in form and detail may be made without departing from the scope of the invention.

We claim:

1. A method in a computer system having an operating system, a graphical user interface and a file system hierarchy, the file system hierarchy comprising locations within which references to file system objects may be stored and having a current location that is modifiable by the user, the method for creating a new file system object to which a reference is stored in the current location, the method comprising the steps of, under the control of the operating system:

displaying via the graphical user interface a list of types of file system objects that may be created;

receiving via the graphical user interface input indicating that a user has selected a displayed file system object type;

creating a new file system object having the selected type; and storing a reference to the created file system object in the current location within the file system hierarchy.

2. The method of claim 1 wherein the user selects the current location via the graphical user interface prior to the displaying, wherein the computer system is capable of invoking an application program, and wherein the creating step creates a new file associated with the application program and stores a reference to the created new file in the selected current location.

3. The method of claim 2, further including the steps of:
receiving from the user an instruction to open the created file; and
in response to receiving the instruction, invoking the application program to open the created file.

4. The method of claim 2 wherein the computer system has an information repository for centrally storing information accessed by the operating system, and wherein the creating step includes the step of retrieving from the information repository information used in the creating step to create the new file.

5. The method of claim 4 wherein the information retrieved from the information repository in the retrieving step was stored in the information repository as part of the installation of the application program.

6. The method of claim 4 wherein the information retrieved from the information repository may be modified by the user to change the manner in which the creating step creates the new file system object.

7. The method of claim 4 wherein the operating system was at an earlier time installed on the computer system, and wherein the information retrieved from the information repository in the retrieving step was stored in the information repository as part of the installation of the operating system.

8. The method of claim 1, further including the step of assigning a name generated by the computer system to the file system object.

9. The method of claim 1, further including the steps of:
receiving a name for the created file system object from the user; and
assigning the received name to the created file system object.

10. The method of claim 2 wherein visual indications of file system objects referred to by the references stored in a preselected one of the locations in the file system hierarchy are displayed in a file system object visual indication display area; and further including the steps of,
if the current location is the preselected location, displaying a visual indication of the created file system object in the file system object visual indication display area.

11. A method for installing an application program on a computer system that stores new file creation information that enables new files associated with the installed application program to be created without assistance of the installed application program, the computer system having a hierarchy of file system object containers and an input device that may be used by a user to select a visual representation of a file system object container, the method comprising the steps of:
storing execution information that enables the application program to be executed on the computer system; and
storing new file creation information that specifies how to create without assistance of the application program a new file associated with the application program, such that selection of a visual representation of a file system object container by the user via the input device may cause a new file to be created using the stored new file creation information, a reference to the created new file to be stored in the file system object container, and the visual representation of the file system object container to be updated to include a visual representation of the created new file.

12. The method of claim 11, further including the step of modifying the stored file creation information in response to input from the user to change the manner in which new files associated with the application program are created.

13. The method of claim 11, further including the step of, under the control of an operating system shell of the computer system, utilizing the stored new file creation information to create a new file associated with an application program in response to a selection of a visual representation of a file system object container by the user via the input device.

14. The method of claim 11 in which the computer system has a specified storage location that may contain application program identifiers identifying installed application programs with which is associated new file creation information that specifies how to create a new file associated with the application program corresponding to the associated application program identifier, and wherein the application program being installed has an application program identifier, and wherein the step of adding information to the specified storage location further comprises the steps of:
a) if the application program identifier for the application program being installed is not present in the specified storage location, storing in the specified storage location the application program identifier for the application program being installed; and
b) storing in the specified storage location an entry associated with the application program identifier for the application program being installed containing the new file creation information.

15. The method of claim 14 in which each application program identifier can be associated with a plurality of entries and each new file that is created can have a specified type, further comprising the step of:
c) storing in the specified storage location another entry associated with the application program identifier for the application program being installed which specifies how to create a new file associated with the application program being installed such that the specified type for the created new file is distinct from the specified types of other new files whose creations can result from entry specifications of other entries associated with the same application program.

16. The method of claim 14 wherein the stored new file creation information specifies creating a file that contains no data information.

17. The method of claim 14 wherein the stored new file creation information specifies creating a file that contains no data information and inserting specified data information into the created file.

18. The method of claim 14 wherein the stored new file creation information specifies creating a file by copying a specified existing file.

19. The method of claim 18 wherein a specification for how to create a new file specifies creating a file by executing a specified executable program in a specified manner.

20. A method for installing an operating system on a computer system that stores new file creation information that enables new files associated with application programs not yet installed to be created, the computer system having an input device that may be used by a user, the method comprising the steps of:
storing execution information that enables the operating system being installed to be executed on the computer system, the execution information including code for creating a new file associated with an application program in response to user input; and for each of a plurality of application programs not yet installed, storing new file creation information that specifies how to create a new file associated with the application program, such that the stored new file creation information may be used to create a new file associated with the application program in response to input received from the user via the input data.

21. The method of claim 20 wherein the new file creation information specifies creating a file by copying a file having a specified file identifier, further including the step of storing a file having the specified file identifier.

22. A method in a computer system having a graphical user interface and an operating system shell for enabling a user of the computer system to create a new file system object associated with a particular application program using the operating system shell, the method comprising the steps of, under the control of the operating system shell:

in response to selection by the user of a file system object container via a visual representation of the file system object container in the graphical user interface, displaying a first menu including an instruction for creating a new file system object;

in response to selection by the user of the instruction for creating a new file system object displayed in the first menu, displaying a second menu containing names of a plurality of types of file system objects that may be created; and in response to the selection of one of the names of the types of file system objects that may be created displayed in the second menu, creating in the selected file system object container a new file system object of the type having the selected name.

23. An apparatus for creating a new file system object associated with one of a plurality of application programs without invoking the associated application program, comprising:

an input device usable by a user to select a displayed representation of a file system object container, to issue an object creation command and to subsequently select one of a displayed list of available object types each associated with an application;

a display device for displaying the representation of the file system object container and for displaying the list of available object types when the object creation command is received in the input device; and an object generation subsystem separate from the application program associated with the selected type for creating an object of the selected type in the file system object container whose displayed representation was selected.

24. The method of claim 1 wherein the computer system provides a visual user work area including icons that represent operations which can be performed on the computer system and icons that represent file system objects, and including the step of adding to the visual user work area an icon representing the created file system object.

25. The method of claim 10, further including the steps of:

receiving from the user an instruction to select the displayed visual indication of the created file system object; and in response to receiving the instruction, invoking an application program associated with the selected type to open the created file system object.

26. The method of claim 10, further including the steps of:

receiving from the user an indication to access the created file system object, the indication from selection by the user of the displayed visual indication of the created file system object; and in response to receiving the indication, displaying a list of programs which can access the created file system object.

27. A method in a computer system having a user, an operating system, and a plurality of file system objects, each file system object having a visual representation, the method for visually creating under the control of the operating system a new file system object with a reference in another file system object, the method comprising the steps of:

displaying to the user the visual representation of a file system object;

receiving an indication of the file system object being selected by the user through selection by the user of the displayed visual representation;

displaying a plurality of types of file system objects that may be created;

receiving input indicating that the user has selected a displayed file system object type; and responding to the received input by, creating a new file system object having the selected type;

updating the selected file system object to contain a reference to the created file system object; and displaying to the user the visual representation of the selected file system object including the visual representation of the created file system object.

28. The method of claim 27 wherein the computer system includes a plurality of application programs and wherein the creating step creates a new file and associates an included application program with the created file in such a manner that the associated application program can be invoked through selection of the created file.

29. The method of claim 28 wherein the associated application program has a default file system object for containing references to new created files with which it is associated, and wherein the selected file system object is not the default file system object.

30. The method of claim 28 wherein no application programs are executing on the computer system during the responding step.

31. The method of claim 27 wherein the displayed types of file system objects that may be created depend on the file system object selected by the user.

32. A computer-readable medium whose contents cause a computer system to create a new file system object in a selected location, the computer system having an operating system and a file system hierarchy, the file system hierarchy comprising locations in which file system objects may be stored and having a current location that is selected by the user, by performing under the control of the operating system the steps of:

displaying a list of types of file system objects that may be created;

receiving input indicating that a user has selected a displayed file system object type;

creating a new file system object having the selected type; and storing the created file system object in the current location within the file system hierarchy.

33. The computer-readable medium of claim 32 wherein the creating step creates a new file associated with an application program, and wherein the contents of the computer-readable medium further cause the computer system to perform the steps of:

receiving from the user an instruction to open the created file; and in response to receiving the instruction, invoking the application program to open the created file.

34. The computer-readable medium of claim 32 wherein the creating step creates a new file associated with an application program, wherein the computer system has an information repository for centrally storing information accessed by the operating system, and wherein the creating step includes the step of retrieving from the information repository information used in the creating step to create the new file.

35. The computer-readable medium of claim 34 wherein the operating system was at an earlier time installed on the computer system, and wherein the information retrieved from the information repository in the retrieving step was stored in the information repository as part of the installation of the operating system.

36. The computer-readable medium of claim 32 wherein visual indications of file system objects stored in a preselected one of the locations in the file system hierarchy are displayed in a file system object visual indication display area, and wherein the contents of the computer-readable medium further cause the computer system to perform the step of:

if the current location is the preselected location, displaying a visual indication of the created file system object in the file system object visual indication display area.

37. The computer-readable medium of claim 32 wherein the computer system provides a visual user work area including icons that represent operations which can be performed on the computer system and icons that represent file system objects, and wherein the storing step includes the step of adding to the visual user work area an icon representing the created file system object.

38. A computer-readable medium whose contents cause a computer system to install an application program on the computer system such that new file creation information is stored on the computer system that enables new files associated with the installed application program to be created without assistance of the installed application program, the computer system having a hierarchy of file system object containers and an input device that may be used by a user to select a visual representation of a file system object container, by performing the steps of:

storing execution information that enables the application program to be executed on the computer system; and storing new file creation information that specifies how to create without assistance of the application program a new file associated with the application program, such that selection of a visual representation of a file system object container by the user via the input device may cause a new file to be created in the file system object container using the stored new file creation information.

39. The computer-readable medium of claim 38, wherein the contents further cause the computer system to perform the step of, under the control of an operating system shell, utilizing in response to a selection of a visual representation of a file system object container by the user via the input device the stored new file creation information to create a new file in the file system object container such that the created new file is associated with an application program.

40. A computer-readable medium whose contents include an application program to be installed on a computer system such that new file creation information is stored on the computer system that enables new files associated with the installed application program to be created without assistance of the installed application program, the computer system having a hierarchy of file system object containers and an input device that may be used by a user to select a visual representation of a file system object container, by performing the steps of:

storing execution information that enables the application program to be executed on the computer system; and storing new file creation information that specifies how to create without assistance of the application program a new file associated with the application program, such that a selection of a visual representation of a file system object container by the user via the input device may cause a new file to be created using the stored new file creation information and a reference to the created new file to be stored in the file system object container.

41. A computer-readable medium whose contents cause a computer system to install an operating system on a computer system that stores new file creation information that enables new files associated with application programs not yet installed to be created, the computer system having an input device that may be used by a user, by performing the steps of:

storing execution information that enables the operating system being installed to be executed on the computer system, the execution information including code for creating a new file associated with an application program in response to user input; and for each of a plurality of application programs not yet installed, storing new file creation information that specifies how to create a new file associated with the application program, such that the stored new file creation information may be used to create a new file associated with the application program in response to input received from the user via the input data.

* * * * *

UNITED STATES PATENT AND TRADEMARK OFFICE
Certificate

Patent No. 5,764,983

Patented: June 9, 1998

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Chee Heng Chew, Redmond, Washington; Joseph D. Belfiore, Redmond, Washington; Mark A. Malamud, Seattle, Washington; and Royce A. Levien, Lexington, Massachusetts.

Signed and Sealed this Seventeenth Day of July, 2001.

THOMAS LEE
*Supervisory Patent Examiner*
Art Unit 2182